United States Patent
Mashiko

(10) Patent No.: US 7,193,871 B2
(45) Date of Patent: Mar. 20, 2007

(54) DC-DC CONVERTER CIRCUIT

(75) Inventor: Takeshi Mashiko, Chiba (JP)

(73) Assignee: Seiko Instruments Inc. (JP)

( * ) Notice: Subject to any disclaimer, the term of this patent is extended or adjusted under 35 U.S.C. 154(b) by 66 days.

(21) Appl. No.: 11/172,697

(22) Filed: Jul. 1, 2005

(65) Prior Publication Data
US 2006/0006852 A1 Jan. 12, 2006

(30) Foreign Application Priority Data
Jul. 7, 2004 (JP) .............................. 2004-200945

(51) Int. Cl.
*H02M 7/757* (2006.01)

(52) U.S. Cl. .......................... 363/79; 363/81; 323/222; 323/224

(58) Field of Classification Search ............ 363/79–81, 363/101, 17, 21.4, 24, 89, 95, 97, 37, 39, 363/20; 323/222, 224, 282, 285
See application file for complete search history.

(56) References Cited

U.S. PATENT DOCUMENTS

| 4,533,986 | A | * | 8/1985 | Jones | 363/17 |
| 4,683,529 | A | * | 7/1987 | Bucher, II | 363/44 |
| 5,180,964 | A | * | 1/1993 | Ewing | 323/222 |
| 5,367,247 | A | * | 11/1994 | Blocher et al. | 323/222 |
| 5,490,055 | A | * | 2/1996 | Boylan et al. | 363/41 |

* cited by examiner

Primary Examiner—Rajnikant B. Patel
(74) Attorney, Agent, or Firm—Adams & Wilks

(57) ABSTRACT

Provided is a DC-DC converter circuit which is stably operated without being affected by a size of an output capacitor (111) and a cost thereof. When a switching element is turned on so that a charge current that was flowing into an output capacitor flows into the switching element, the current is converted into a voltage to be added to an output voltage, and a resultant voltage is fed back to a control system.

4 Claims, 3 Drawing Sheets

DC-DC CONVERTER CIRCUIT

BACKGROUND OF THE INVENTION

1. Field of the Invention

The present invention relates to phase compensation of a DC-DC converter circuit.

2. Description of the Related Art

In general, when phase compensation is not performed on a DC-DC converter circuit, the stable operation thereof cannot be ensured. There has been widely known a method of connecting a resistor with an output capacitor in series as one of the methods of performing the phase compensation.

FIG. 3 is a circuit diagram showing a conventional chopper type boosting DC-DC converter circuit. For the phase compensation to ensure the stable operation, a phase compensation resistor 112 is connected with an output capacitor 111 in series, or an output capacitor provided with an equivalent series resistor is used, thereby providing a zero point. In order to perform sufficient phase compensation, it is necessary to set a frequency fz at the zero point in a frequency band for which the phase compensation is required. Here, assume that a capacitance value of the output capacitor 111 is given by $C_{out}$, a resister value of the phase compensation resistor 112 is given by $R_{ESR}$, the frequency fz at the zero point is expressed by the following expression (1).

$$fz = 1/(2\Pi \times C_{out} \times R_{ESR}) \quad (1)$$

FIG. 4 is a timing chart of the chopper type boosting DC-DC converter circuit. In the chopper-type boosting DC-DC converter circuit shown in FIG. 3, a current flows through a rectifying device 110 when a switching element 104 is turned off, and the current does not flow through the rectifying device 110 when the switching element 104 is turned on. Therefore, a variation in current Ipk is caused in the rectifying device 110. Therefore, when the resister value of the phase compensation resistor 112 is given by $R_{ESR}$, a ripple voltage Vpk expressed by the following expression (2) is generated in an output voltage.

$$Vpk \approx Ipk \times R_{ESR} \quad (2)$$

In general, when the ripple voltage Vpk generated in the output voltage is large, normal feedback control is not performed, so the stable operation cannot be ensured. Therefore, in order to suppress generation of the ripple voltage Vpk in the output voltage, it is necessary to set the resister value $R_{ESR}$ of the phase compensation resistor 112 to a small value. (See JP 07-274495 A (FIG. 1))

However, when the resister value $R_{ESR}$ of the phase compensation resistor 112 is set to a small value, it is necessary to increase the capacitance value $C_{out}$ of the output capacitor 111 in order to achieve sufficient phase compensation. Therefore, there is a problem in that a size of the output capacitor 111 is made large and a cost thereof is increased.

SUMMARY OF THE INVENTION

The present invention has been made to solve the conventional problem as described above. An object of the present invention is to provide a DC-DC converter circuit which is stably operated.

According to the present invention, when a switching element is turned on so that a charge current that was flowing into an output capacitor flows into the switching element, the charge current is converted into a voltage. A variation component in the converted voltage is added to an output voltage and a resultant voltage is fed back to a control system.

As described above, according to the present invention, it is possible to provide a DC-DC converter circuit which can be stably operated even with a small output capacitor by suppressing a ripple voltage Vpk generated in the output voltage. The improvement of stability similar to a current mode can be also desired.

DETAILED DESCRIPTION OF THE PREFERRED EMBODIMENTS (First Embodiment)

Figure 1:
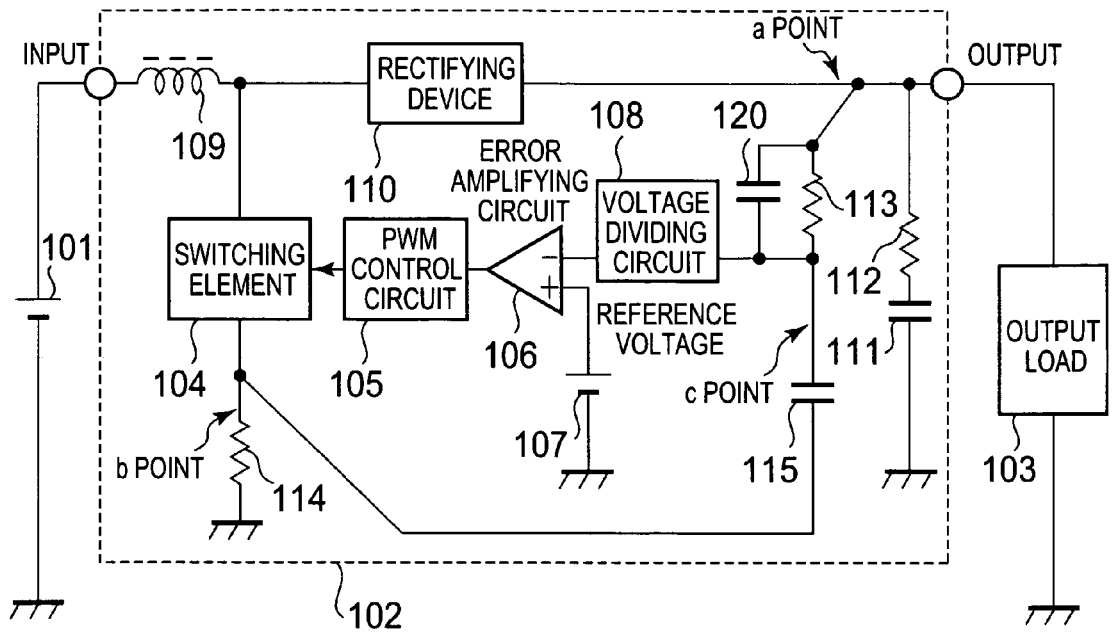
FIG. 1 is a diagram showing a chopper type boosting DC-DC converter circuit according to a first embodiment of the present invention.

FIG. 1 is a diagram showing a chopper type boosting DC-DC converter circuit according to a first embodiment of the present invention.

In the chopper type boosting DC-DC converter circuit shown in FIG. 1, an input voltage from a power source 101 is subjected to energy conversion by an inductor 109, a switching element 104, a rectifying device 110, and an output capacitor 111, to generate an output voltage. Then, an error amplifying circuit 106 compares a reference voltage 107 with a voltage obtained by dividing the output voltage by a voltage dividing circuit 108 to generate an output signal for controlling a PWM control circuit 105. The PWM control circuit 105 outputs a pulse control signal to the switching element 104 to maintain the output voltage at a predetermined level. A phase compensation resistor 112 is inserted between the output capacitor 111 and the rectifying device 110. A feedback resistor 113 and a feedback capacitor 120, which are connected in parallel with each other, are connected between a connection point (a point), at which the rectifying device 110 and the phase compensation resistor 112 are connected, and the voltage dividing circuit 108. A ripple voltage correction resistor 114 is connected between the switching element 104 and GND. A ripple voltage correction capacitor 115 is connected between a connection point (b point), at which the switching element 104 and the ripple voltage correction resistor 114 are connected, and a connection point (c point), at which the feedback resistor 113 and the voltage dividing circuit 108 are connected.

Figure 2:
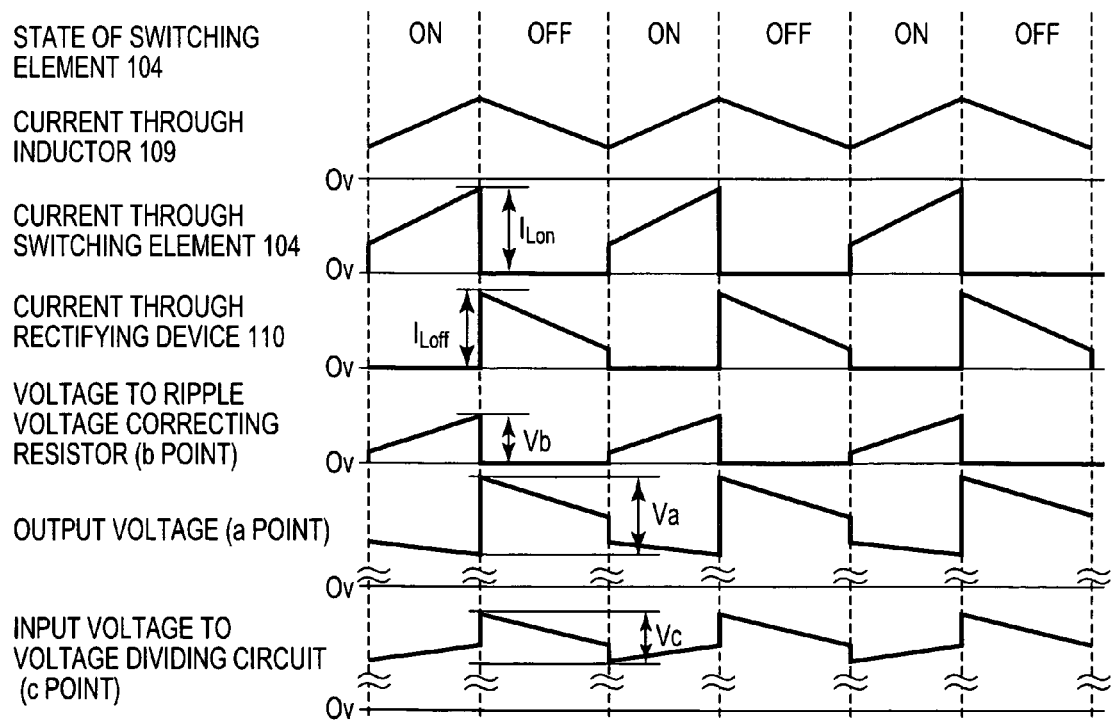
FIG. 2 is a timing chart of the chopper type boosting DC-DC converter circuit according to the first embodiment of the present invention.
Figure 3:
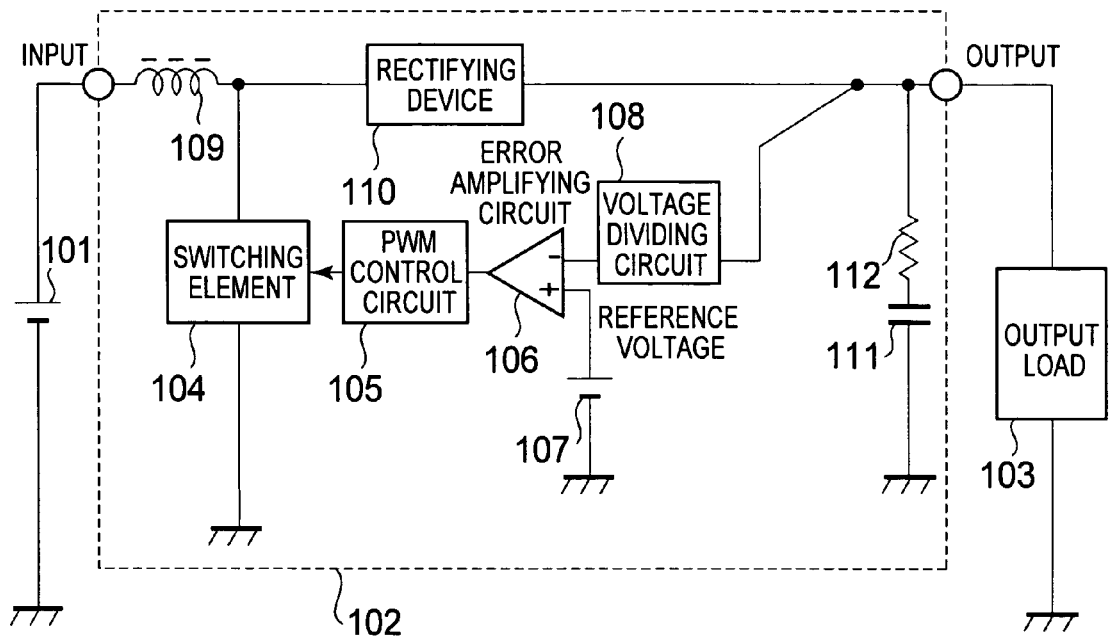
FIG. 3 is a diagram showing a conventional chopper type boosting DC-DC converter circuit.
Figure 4:
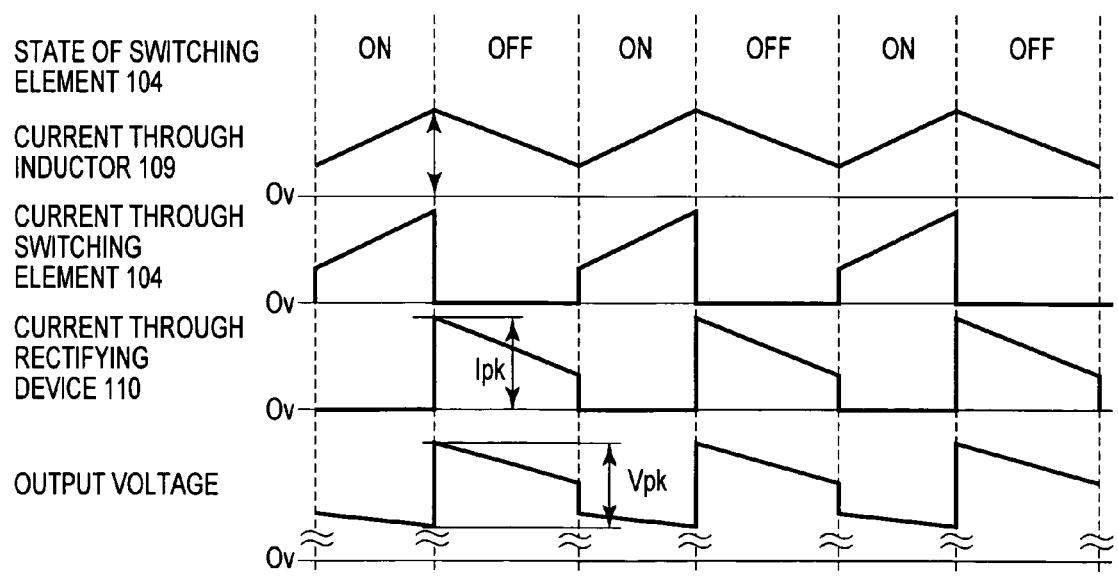
FIG. 4 is a timing chart of the conventional chopper type boosting DC-DC converter circuit.

FIG. 2 is a timing chart of the chopper type boosting DC-DC converter circuit according to the first embodiment of the present invention and the operation thereof will be described below.

First, when the switching element 104 is turned off, a current from the indictor 109 flows into the rectifying device 110, to thereby rise a voltage at the connection point (a point) between the rectifying device 110 and the phase compensation resistor 112. When the current flowing into the rectifying device 110 is given by $I_{Loff}$ and a resistance value of the phase compensation resistor 112 is given by $R_{ESR}$, a rising voltage Va is expressed by the following expression (3).

$$Va \approx I_{Loff} \times R_{ESR} \qquad (3)$$

Next, when the switching element 104 is turned on, the current from the indictor 109 flows into the switching element 104. Therefore, the voltage at the connection point (a point) between the rectifying device 110 and the phase compensation resistor 112 lowers, so a voltage rises at the connection point (a point) between the switching element 104 and the ripple voltage correction resistor 114. When the current flowing into the switching element 104 is given by $I_{Lon}$ and a resistance value of the ripple voltage correction resistor 114 is given by $R_{SENSE}$, a rising voltage Vb is expressed by the following expression (4).

$$Vb \approx I_{Lon} \times R_{SENSE} \qquad (4)$$

A variation in voltage Vc at the input point (c point) of the voltage dividing circuit 108 is expressed by the following expression (5).

$$Vc \approx I_{Loff} \times (R_{ESR} - R_{SENSE}) \qquad (5)$$

Thus, by adjusting the resistance value $R_{ESR}$ of the phase compensation resistor 112 and the resistance value $R_{SENSE}$ of the ripple voltage correction resistor 114, it is possible to reduce the variation in voltage Vc at the input point (c point) of the voltage dividing circuit 108, that is, the ripple voltage to be inputted to the voltage dividing circuit 108.

According to such a method, even when a capacitor whose size is small, cost is low, and capacitance value is small, is used as the output capacitor 111, feedback control can be performed based on a signal having a small ripple voltage, so stable operation is possible.

Further, a capacitance value of the feedback capacitor 120 is set to a value smaller than that of the ripple voltage correction capacitor 115 or the feedback capacitor 120 is removed, or a resistance value of the phase compensation resistor 112 is set to a value smaller than that of the ripple voltage correction resistor 114 or the phase compensation resistor 112 is removed, so that the ripple-voltage Vb which is expressed by the expression (4) and generated by the ripple voltage correction resistor 114 as a main cause becomes dominant as compared with the ripple voltage Va which is expressed by the expression (3) and generated by the phase compensation resistor 112 as a main cause. Therefore, the current flowing into the inductor 109 which is increased or decreased according to a time for which the switching element is being turned on can be fed back during the switching element 104 is being turned on. Thus, it is possible to further expand a stable operational region.

(Second Embodiment)

Figure 5:
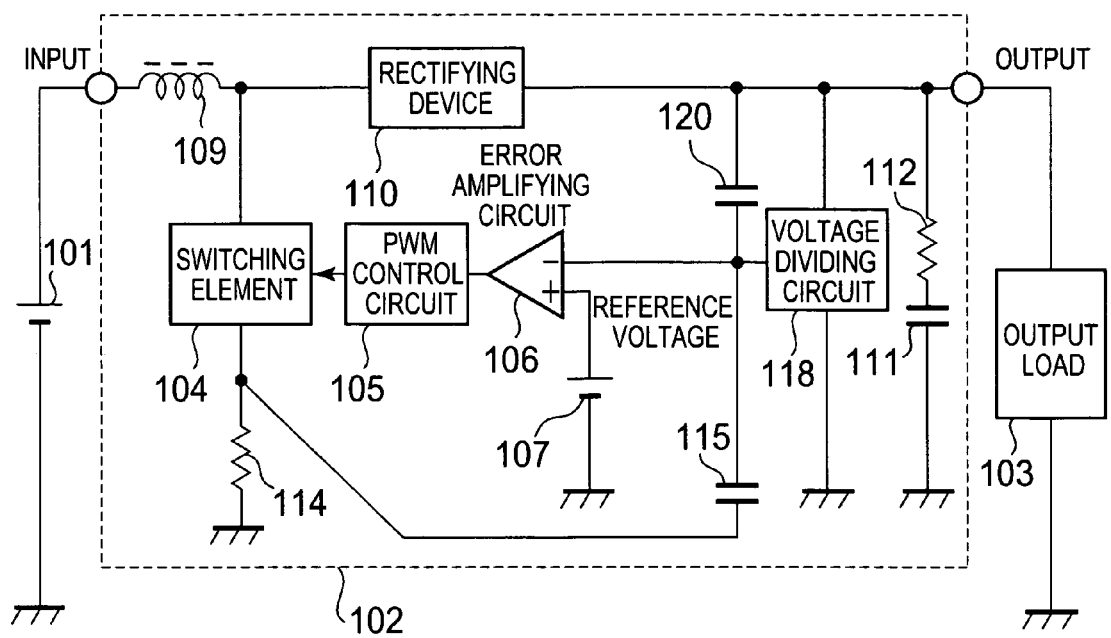
FIG. 5 is a diagram showing a chopper type boosting DC-DC converter circuit according to a second embodiment of the present invention.

FIG. 5 is a diagram showing a chopper type boosting DC-DC converter circuit according to a second embodiment of the present invention. In the chopper type boosting DC-DC converter circuit shown in FIG. 5, the ripple voltage correction resistor 114 is connected between the switching element 104 and GND. The ripple voltage correction capacitor 115 is connected between the connection point, at which the switching element 104 and the ripple voltage correction resistor 114 are connected, and an input point of the error amplifying circuit 106. The feedback capacitor 120 is connected between the input point of the error amplifying circuit 106 and the rectifying device 110. According to the circuit structure as shown in FIG. 5, the output voltage can be fed back to the error amplifying circuit 106 with a state in which the ripple voltage is reduced, so stable operation is possible.

(Third Embodiment)

Figure 6:
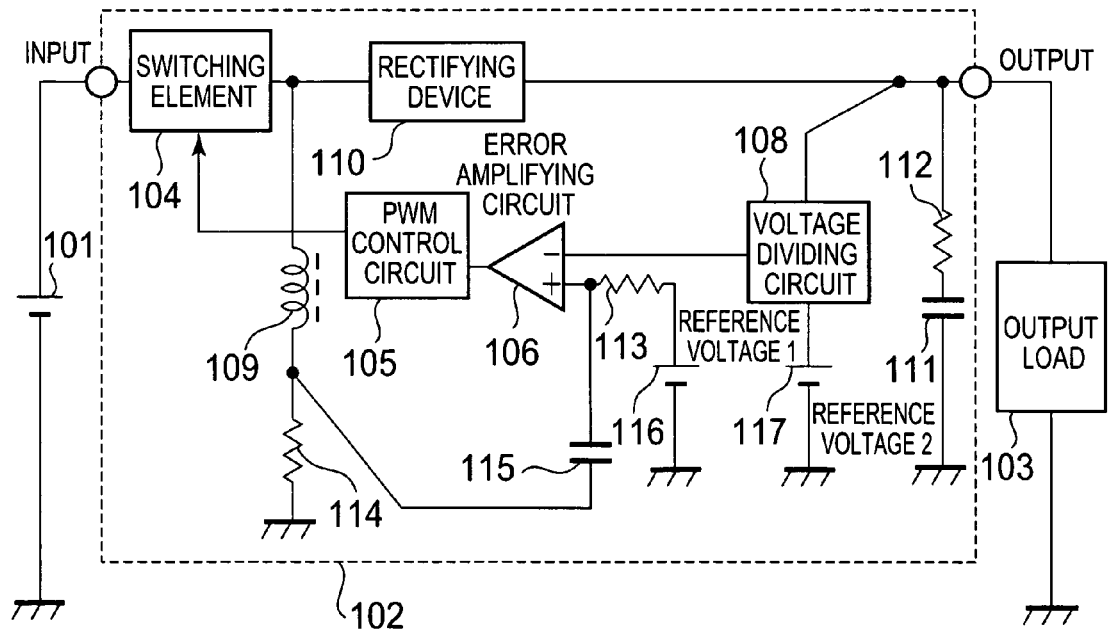
FIG. 6 is a diagram showing a chopper type inverting DC-DC converter circuit according to a third embodiment of the present invention.

FIG. 6 is a diagram showing a chopper type inverting DC-DC converter circuit according to a third embodiment of the present invention. In the chopper type inverting DC-DC converter circuit shown in FIG. 6, the input voltage from the power source 101 is inputted to the switching element 104. The switching element 104 is connected with GND through the inductor 109 and the ripple voltage correction resistor 114. In addition, the switching element 104 is connected with GND through the rectifying device 110, the phase compensation resistor 112, and the output capacitor 111. The connection point between the rectifying device 110 and the phase compensation resistor 112 is connected with the voltage dividing circuit 108. A second reference voltage circuit 117 is connected between the voltage dividing circuit 108 and GND. An output from the voltage dividing circuit 108 is inputted to an inverting input terminal of the error amplifying circuit 106.

A non-inverting input terminal of the error amplifying circuit 106 is connected with a first reference voltage circuit 116 through the feedback resistor 113. The ripple voltage correction capacitor 115 is connected with the connection point between the inductor 109 and the ripple voltage correction resistor 114. An output terminal of the error amplifying circuit 106 is connected with the PWM control circuit 105. An output terminal of the PWM control circuit 105 is connected with the switching element 104.

According to the circuit structure as shown in FIG. 6, when the reference voltage inputted to the error amplifying circuit 106 is controlled, the output voltage can be fed back to the error amplifying circuit 106 with a state in which the influence of the ripple voltage is reduced, so stable operation is possible.

What is claimed is:

1. A DC-DC converter circuit for performing switching control by feedback of an output voltage, including an inductor, a rectifying device, a voltage dividing circuit, a reference voltage circuit, and an output capacitor, the DC-DC converter circuit comprising:

a switching element;

an error amplifier; and a feedback circuit provided between the switching element and the error amplifier, wherein when a charge current flowing into the output capacitor flows into the switching element, the feedback circuit converts the charge current flowing into the switching element into a voltage, adds the converted voltage to the output voltage, and feeds back the output voltage to which the converted voltage is added to the error amplifier.

2. A DC-DC converter circuit according to claim 1, wherein the feedback circuit comprises:

a feedback resistor connected between a connection point, at which the rectifying device and the output capacitor are connected, and the voltage dividing circuit;

a ripple voltage correction resistor connected between the switching element and GND; and a ripple voltage correction capacitor connected between a connection point, at which the switching element and the ripple voltage correction resistor are connected, and a connection point, at which the feedback resistor and the voltage dividing circuit are connected.

3. A DC-DC converter circuit according to claim 1, wherein the feedback circuit comprises:

a ripple voltage correction resistor connected between the switching element and GND; and a ripple voltage correction capacitor connected between a connection point, at which the switching element and the ripple voltage correction resistor are connected, and an input terminal of the error amplifier.

4. A DC-DC converter circuit according to claim 1, wherein the feedback circuit comprises:

a feedback resistor connected between the reference voltage circuit and an input terminal of the error amplifier;

a ripple voltage correction resistor connected between the inductor and GND;

a ripple voltage correction capacitor connected between a connection point, at which the inductor and the ripple voltage correction resistor are connected, and a connection point, at which the input terminal of the error amplifier and the feedback resistor are connected; and a second reference voltage circuit connected between the voltage dividing circuit and the GND.

* * * * *